Sept. 13, 1966 R. N. THOMSON 3,272,172
LOAD OR VEHICLE SUPPORTING DEVICES
Filed Aug. 31, 1964 4 Sheets-Sheet 1
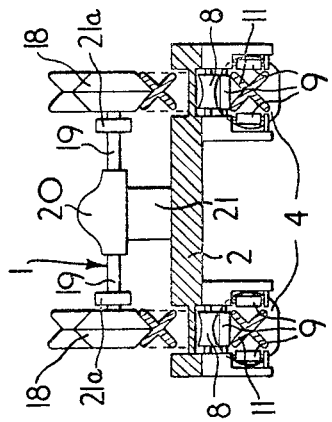
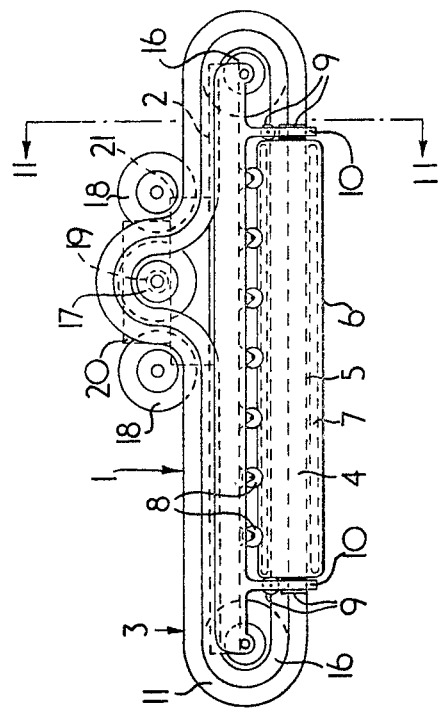

Sept. 13, 1966  R. N. THOMSON  3,272,172
LOAD OR VEHICLE SUPPORTING DEVICES
Filed Aug. 31, 1964  4 Sheets-Sheet 2
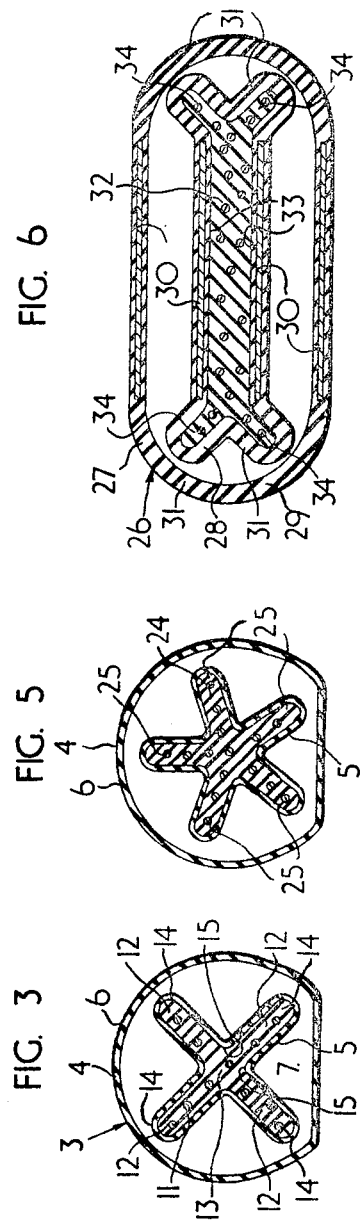
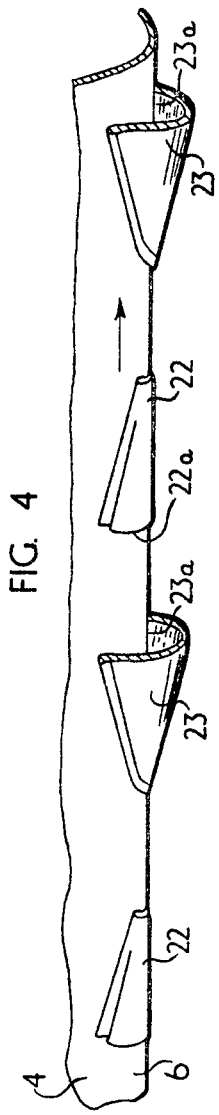
Inventor:
Richard Noel Thomson
by Benj. T. Rauber
Attorney Sept. 13, 1966    R. N. THOMSON    3,272,172
LOAD OR VEHICLE SUPPORTING DEVICES
Filed Aug. 31, 1964    4 Sheets-Sheet 3
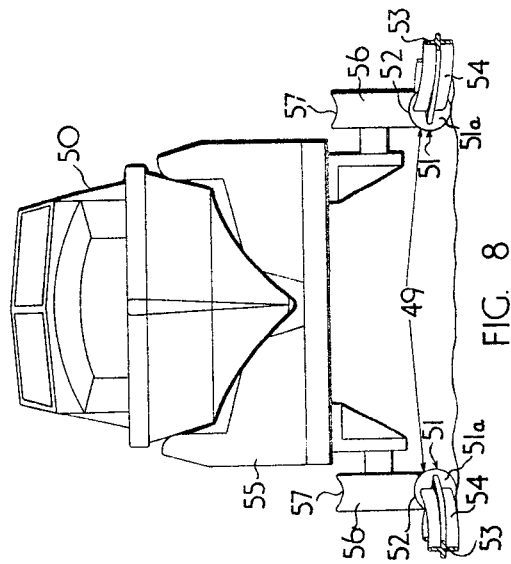
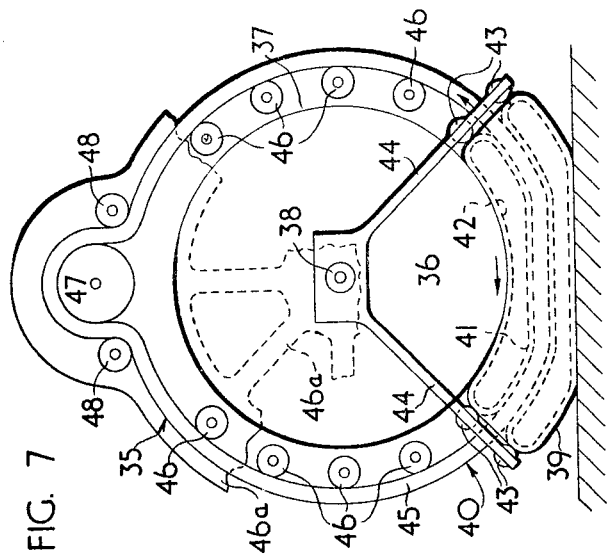
Inventor:
Richard Noel Thomson
by Benj. T. Rauber
Attorney

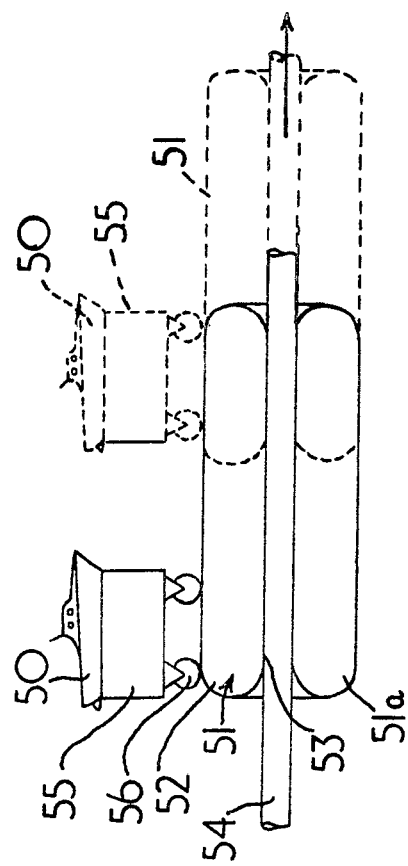

United States Patent Office 3,272,172
Patented Sept. 13, 1966

3,272,172
LOAD OR VEHICLE SUPPORTING DEVICES
Richard Noel Thomson, Coleshill, England, assignor to Dunlop Rubber Company Limited, London, England, a British company
Filed Aug. 31, 1964, Ser. No. 393,235
Claims priority, application Great Britain, Sept. 6, 1963, 35,234/63
16 Claims. (Cl. 115—1)

This invention relates to load or vehicle supporting devices.

According to the invention, a load or vehicle supporting device comprises an annular inflatable support having two annular walls which lie one radially within the other with respect to a longitudinal axis of the support and form opposing sides of an annular inflatable chamber, and having a reinforcement of substantially inextensible material, the walls being relatively axially movable to cause rolling movement of the support in the axial direction by eversion of the walls of the support, the device also comprising a driving member extending axially through the support, the driving member having a longitudinal axis and being provided with projections against which the radially inner wall of the support lies and is wrapped around in the inflated state of the support, whereby axial movement of the driving member and thus the radially inner wall of the support relative to the radially outer wall thereof effects rolling movement of the support in said axial direction so that a load supported upon the device is moved or can be moved in said axial direction.

In the device above defined, because the driving member is provided with projections and the radially inner wall lies against and is wrapped around the projections in the inflated state of the support, the area of engagement between said inner wall and the driving member is greater than would be the case if no projections were provided upon the driving member.

Preferably, the driving member lies in engagement with substantially the whole of the radially inner wall of the support in the inflated state thereof.

Preferably also, the driving member comprises at least three longitudinally extending projections which extend away from its longitudinal axis, and the distance around the outer peripheral surface of the driving member, measured in a plane normal to its longitudinal axis, is at least equal to or substantially equal to the similarly measured distance around the outer peripheral surface of the support in the inflated condition thereof. In a preferred construction, each projection provided on the driving member is a fin. Alternatively, the projections may be in the form of lobes.

In a further preferred construction, the reinforcement of substantially inextensible material comprises at least two layers of substantially inextensible cords, the cords in each layer lying parallel and extending at a bias angle to the longitudinal axis of the support with the angle of the cords in one layer being of opposite sense, with respect to said axis, from the angle of the cords in the other layer. Alternatively, said reinforcement comprises at least two layers of substantially inextensible cords, the cords in each layer being substantially parallel to one another, and the cords in one layer lying in a plane normal to the axis of the support and extending in a direction different from that of the cords in the other layer or at least one of the other layers. The reinforcement of substantially inextensible material may, however, comprise a woven textile fabric. Such a fabric is a knitted textile fabric.

Preferably, the inflatable support comprises a natural or synthetic rubber within which the reinforcement of substantially inextensible material is embedded.

Preferably also, the driving member of the supporting device is an endless flexible belt, and a plurality of collapsible pockets may be provided upon the ground-contacting portions of the radially inner and outer walls, each pocket being constructed and arranged so that upon rotation of the support when floating in a liquid medium, the force of the liquid flowing past the collapsible pockets causes the pockets to open to provide a resisting force to the said flowing medium said force serving as a force for driving the device through the medium.

In addition, collapsible pockets may be provided which are arranged so that rotation of the support in either direction will cause opening of some at least of the pockets.

The invention also includes a vehicle comprising at least one supporting device as defined in the next prior to the last preceding paragraph, the inflatable member of the device supporting the vehicle, and the driving member extending in driving engagement around a plurality of pulley wheels rotatably mounted upon the vehicle, one at least of the pulley wheels being a driving wheel, the vehicle being provided with at least one rotatable member freely rotatably mounted thereon in a fixed rotational position and in engagement with one axial end of the inflatable support, and driving member means for driving the driving pulley wheel and the driving member to cause axial movement of the inflatable support in the direction of the rotatable member to propel the vehicle.

The invention further includes a wheel assembly comprising a vehicle support wheel having a rim, and a supporting device as defined in the next prior to the last two preceding paragraphs, the inflatable support of the device being located with its axis extending circumferentially of the wheel and with its radially outer surface in driving engagement with the wheel rim, and the driving member extending through the inflatable support and in driving engagement around a plurality of pulley wheels which are radially spaced-apart from the support wheel which is rotatable relative to the pulley wheels, at least one rotatable member being provided in engagement with one axial end of the inflatable support, the rotatable member being rotatably mounted upon a mounting means to hold it in a fixed rotational position relative to a vehicle when the wheel assembly is mounted upon the vehicle, so that when the assembly is so mounted with the inflatable support in engagement with the ground, axial movement of the driving member to cause axial movement of the inflatable support in the direction of the rotatable member, propels the rotatable member and the vehicle in said direction.

Embodiments of the invention will now be described, by way of example, with reference to the accompanying drawings in which:

FIGURE 1 is a side elevational view of a vehicle incorporating two vehicle supporting devices according to the invention;

FIGURE 2 is a transverse cross-sectional view of the vehicle shown in FIGURE 1 on line II—II in FIGURE 1;

FIGURE 3 is a transverse cross-sectional view, on a larger scale than that of FIGURE 2, of a part of one of the vehicle supporting devices shown in FIGURES 1 and 2;

FIGURE 4 is an isometric view of a part of a vehicle supporting device forming a modification of the devices shown in FIGURES 1 to 3;

FIGURE 5 is a view similar to that shown in FIGURE 3 of a further modification of the first embodiment;

FIGURE 6 is a view similar to that shown in FIGURE 3 of a second embodiment of the invention;

FIGURE 7 shows a side elevational view of a wheel assembly forming a third embodiment of the invention;

FIGURE 8 is an end view of a load supporting device assembly forming a fourth embodiment, showing the assembly supporting a boat for movement across a beach;

FIGURE 9 is a diagrammatic side elevational view of the assembly shown in FIGURE 8, illustrating the method of use of the assembly for supporting a load during movement of the load in a desired direction.

In a first embodiment as shown in FIGURES 1 and 2, a load carrying vehicle 1 for use particularly upon rough or loose terrain comprises a chassis 2.

The vehicle is provided with two vehicle supporting devices 3 which are located, as shown in FIGURE 2, one beneath each side of the chassis. Each device comprises an annular inflatable support in the form of an inflatable bag 4, the two bags of the devices having longitudinal axes which lies parallel to one another and extend in a direction from front to rear of the vehicle. As is more particularly shown in FIGURE 3, each bag comprises a radially inner annular wall 5 and a radially outer wall 6 which in an unloaded inflated condition of the bag is substantially cylindrical, the walls defining between them an annular inflatable chamber 7. The bag of each device comprises a natural-rubber-covered reinforcement, the reinforcement comprising two layers of parallel nylon cords the cords in each layer extending substantially at an angle of 30° to the longitudinal axis of the bag, the angle of the cords of one layer being of opposite sense with respect to said axis to the angle of the cords in the other layer.

The vehicle chassis is supported upon each bag by seven spaced-apart rollers 8 (FIGURE 1) which are freely rotatably mounted beneath the chassis, the rollers lying in engagement with the upper regions of the outer peripheral surface of the wall 6 of the bag. Each roller, as shown in FIGURE 2, has an outer peripheral surface which is concave in a cross-section containing the axis of the roller so that substantially the whole axial length of each roller engages its associated bag. Two rotatable members, in the form of three rollers 9, lie in engagement with each axial end of each bag 4 (FIGURE 1), the three rollers at each end of the bag being freely rotatably mounted upon bracket members 10 depending from the chassis.

Each device 3, as shown in FIGURES 1 and 2, also comprises a driving member which is an endless flexible driving belt 11 which extends axially through the bag driving engagement between the belt and the inner wall 5 being effected in the inflated condition of the bag by the inflation pressure causing the wall to grip the belt. Each belt comprises a rubber-covered steel cord reinforcement, the cords extending longitudinally of the belt to render it substantially inextensible in a longitudinal direction.

Each belt 11, as shown in cross-section in FIGURE 3, comprises four projections in the form of four circumferentially spaced-apart symmetrically-located fins 12 which extend longitudinally of the belt and are integrally formed with a central portion 13 of the belt, the radially outer ends 14 of the fins being of convex rounded form and the roots of adjacent fins merging together with concavely-shaped surfaces 15.

As shown in FIGURE 1, each belt 11 extends from the ends of its associated bag 4, around two freely rotatable pulley wheels 16 located one at each end of the chassis, across the chassis, and between a driving pulley wheel 17 disposed above the chassis, and two idler pulley wheels 18 which are used to hold the belt in driving engagement with the driving pulley wheel. Each of the pulley wheels 16, 17 and 18 is formed with an outer peripheral surface which is of complementary shape to, and lies in intimate engagement with, the part of the surface of the belt which lies between the radially outer ends 14 of a pair of adjacent fins 12.

As shown in FIGURES 1 and 2, each of the driving pulley wheels 17 is driven by a shaft 19, through a differential gear 20 by a driving means in the form of a motor unit 21 mounted upon the chassis. Independently operable brakes 21a are provided to the shafts for braking and steering purposes.

In use of the vehicle, when the bags are in an inflated condition, the distance around the outer peripheral surface of each belt, measured in a plane normal to the longitudinal axis of the bag, as shown in FIGURE 3, is substantially equal to, but not less than, the similarly measured distance around its associated bag. In the inflated condition of each bag as shown in FIGURE 3, substantially the whole of the inner wall 5 of the bag lies in driving engagement with the outer peripheral surface of the belt. To propel the vehicle, belts 11 are driven axially through the bags by motor units 21, gear 20 and shafts 19. Because of the driving engagement of the outer peripheral surface of each belt with the radially inner wall of its associated bag, movement of the belt through the bag causes the inner wall 5 to move axially relative to the outer wall 6 so that the bag is caused to roll axially across the ground in the direction of movement of the inner wall by continuous eversion of the two walls. Axial movement of the bags is transferred to the vehicle by the rollers 9 which lie in front of the bags, in the sense of the direction of movement, so that the bags propel the vehicle in that direction. As the distances around the outer peripheral surfaces of the bags and the belts are substantially equal as described above, then as eversion takes place during axial rolling movement, portions of the bags are not required to stretch as they change from inner wall to outer wall positions. This results in little or no circumferential tension of the material of the bags so that there is little or no tendency for fatigue failure of the bags.

In a modification of the first embodiment (FIGURE 4) in which the vehicle is designed also as an amphibious vehicle, the ground contacting portions of the inner and outer walls of each bag 4 are provided with two sets 22 and 23 of flexible collapsible pockets disposed in axially spaced-apart relationship around the walls, the pockets being alternately of one set and then of the other as shown in FIGURE 4. FIGURE 4 shows only the lower portion of the radially outer wall 6 of one of the bags. Each pocket has an entrance at one of its ends, the entrances 22a of the pockets of set 22 facing axially in one direction and the entrances 23a of the pockets of the set 23 facing in the opposite direction. The pockets of each bag 4 are formed from rubber-covered nylon cord material so that during axial rolling movement of each bag, each pocket as it moves along the inner wall of the bag, flattens against the inner peripheral surface of the bag upon engagement with the driving belt 11. Similarly, when the vehicle is traveling across the ground, each pocket, as it travels along the outer wall 6 of the bag, is flattened between the bag and the ground. However, when the vehicle is supported upon water and the bags are being driven with an axial rolling movement by the belts 11, the pockets located upon the outer wall of each bag having their entrances facing in the direction of movement of the outer wall of the bag, have their entrances opened by the force of the water, to provide a resisting force to the water to form paddles to propel the vehicle forwards. This condition is shown in FIGURE 4 in which, with the vehicle supported upon water, the outer wall 6 of each bag is being driven in the direction of the arrow so that the entrances 23a of the pockets of set 23 are opened to propel the vehicle forwards, i.e. in the opposite direction to that of movement of the outer walls of the bags. To drive the vehicle in reverse, the bags vehicle by the rollers 43 which lie in front of the bag, in the sense of the direction of movement, so that the bags of all the assemblies propel the vehicle in that direction. As described in the first embodiment, during axial rolling movement of each bag, there is little or no peripheral tension in the material of the bag.

The vehicles described in each of the first, second and third embodiments may successfully be used instead of conventional tracked vehicles upon rough or loose or marshy terrain. In addition, the inflatable bags of the vehicles provide a more comfortable ride for the passengers and some low frequency vibrations, which are present with conventional solid tracked vehicles, are damped out.

Furthermore, the use of substantially inextensible bags in the constructions described in embodiments one to three inclusive, provide a new kind of vehicle supporting means.

In a fourth embodiment, shown in FIGURES 8 and 9 a load supporting device assembly 49 for supporting a small boat 50 during movement of the boat over a rough stony beach, comprises two supporting devices 51. Each device 51 comprises an annular inflatable bag 51a, each of which is of similar construction to that of the bags 4 described in the first embodiment.

In its inflated condition, each bag measures 50 ft. in length and is substantially cylindrical in form with an outside diameter of 4 inches.

Each bag comprises a radially outer annular wall 52 radially surrounding a radially inner annular wall 53 with respect to a longitudinal axis of the bag.

Two driving belts 54 are provided for the device, one driving belt for each bag. Each driving belt, which is endless in form, is of construction similar to that of the belts of the first embodiment and extends axially through its associated bag, driving engagement between the outer peripheral surface of the belt and the radially inner wall of the bag being effected in the inflated condition of the bag, by the inflation pressure causing the inner wall to grip the belt.

In use of the device assembly, when the bags are in inflated conditions, the peripheral distances around each belt and its associated bag are substantially equal as described in the first embodiment. The two bags are laid, in inflated conditions, side-by-side upon the rough stony beach (FIGURE 8) with their longitudinal axes lying substantially parallel and extending in the direction in which it is desired that the boat should be propelled.

The boat to be moved across the beach is secured to a trolley 55 which is mounted across the two inflated bags, the trolley being provided with wheels 56 for engagement with the outer walls of the bags, the wheels having concavely-shaped running surfaces 57 for guiding the wheels of the trolley upon the supports.

The trolley is then conveyed along the beach in the following manner with reference to the diagrammatic view shown in FIGURE 9. At the commencement of operations, the boat, trolley, and bags are in the full outline position shown in FIGURE 9.

The trolley carrying the boat is propelled axially along the stationary bags from one end of the bags to the other, i.e. from the full outline position to the dotted outline position of FIGURE 9. When the trolley reaches the dotted outline position adjacent to the other ends of the bags, a pull is exerted upon each of the belts in the direction of the arrow in FIGURE 9, causing the belt to move axially through its associated bag to effect axial rolling movement of the bag to the dotted outline position in FIGURE 9. During this movement of the bags, the trolley remains stationary relative to the beach as there is no relative movement between the outer walls of the bags and the beach, so that a further length of each support is laid in front of the trolley as is clear from the dotted outline positions of the trolley and the bag. The ment of the trolley along the supports, until the boat reaches its destination.

Throughout transportation of the boat, the boat is moved more easily along the inflated bags than it would be if carried across the rough stony beach solely by the trolley as the supporting surfaces of the bags are more even than the rough beach. Further, as the weight of the boat and trolley is spread across the beach by the bags, the tendency for the bags to sink into the beach is less than the tendency for the trolley to sink in a case where the assembly is not used in boat transportation. In addition, the assembly is portable in a deflated state of the bags.

In a case where the boat is transported across the beach and into the water, the bags of the devices may then be deflated and attached to the sides of the boat, in which position, after re-inflation, they act as buoyancy bags or as buffers to prevent damage occuring to the boat for instance by striking the wall of a dock.

Having now described my invention what I claim is:

1. A load supporting device comprising an annular inflatable support having a longitudinal axis, two annular walls which lie radially one within the other with respect to said axis and define between them an annular inflatable chamber, and a reinforcement of substantially inextensible material, the walls being relatively axially movable to cause axial rolling movement of the support by eversion of said walls, the device also comprising a driving member which has a longitudinal axis and is provided with projections, the driving member extending axially through the support the radially inner wall of which lies against and is wrapped around the projections in the inflated state of the support to effect movement of the radially inner wall of the support relative to the radially outer wall by axial movement of the driving member, to cause axial rolling movement of the support.

2. A device according to claim 1 wherein the driving member lies in engagement with substantially the whole of the radially inner wall of the support in the inflated state thereof.

3. A device according to claim 1 wherein the driving member comprises at least three longitudinally extending projections which extend away from its longitudinal axis, and the support and the driving member are each provided with an outer peripheral surface, and the distance around the outer peripheral surface of the driving member, measured in a plane normal to its longitudinal axis, is at least equal to or substantially equal to the similarly measured distance around the outer peripheral surface of the support in the inflated condition thereof.

4. A device according to claim 3 wherein each projection of the driving member is a fin.

5. A device according to claim 1 wherein said reinforcement comprises at least two layers of substantially inextensible cords, the cords in each layer lying parallel and extending at a bias angle to the longitudinal axis of the support with the angle of the cords in one layer being of opposite sense, with respect to said axis, from the angle of the cords in the other layer.

6. A device according to claim 1 wherein said reinforcement of substantially inextensible material comprises at least two layers of substantially inextensible cords, the cords in each layer being substantially parallel to one another, and the cords in one layer lying in a plane normal to said axis of the support and extending in a direction different from that of the cords in the other layer.

7. A device according to claim 1 wherein said reinforcement of substantially inextensible material comprises a woven textile fabric.

8. A device according to claim 1 wherein the radially inner and outer walls of the inflatable support are provided with a ground-contacting portion, and a transversely rigid reinforcement is provided in the ground-contacting portion to render said portion transversely rigid and to are driven with their outer walls moving in the opposite direction to the direction of the arrow so that the pockets of set 23 are held in a closed condition by the force of water and the entrances of pockets 22 are opened by the force of the water. Steering is effected as before by differential surface speeds of the two bags.

In a further modification of the first embodiment, shown in FIGURE 5, the vehicle is of similar construction to that described in the first embodiment, except that in this case, each supporting device 3 comprises a belt 24 which is provided with five circumferentially and symmetrically spaced fins 25 instead of being provided with four fins as described above. The distances around the outer peripheral surfaces of the belt 25 and of the bag 4 of each supporting device, measured in a plane normal to the longitudinal axis, are substantially equal as described in the first embodiment.

In a second embodiment of the invention, a vehicle is provided with two supporting devices 26, one of which is shown in cross-section in FIGURE 6, which are of different construction from the devices 3 of the first embodiment. The vehicle is otherwise constructed in a manner similar to that described in the first embodiment.

Each supporting device 26 comprises an inflatable bag 27 having a radially inner wall 28 and a radially outer wall 29, and, as shown in FIGURE 6, the ground-contacting portions of the bag are provided with a natural rubber covered transversely rigid reinforcement 30 which extends along the ground-contacting portions of the inner and outer walls to render these portions transversely rigid, these portions in transverse cross-section being linear in form. Another reinforcement 30 is located in the upper part of the bag and extends along the upper portions of the walls. Each reinforcement 30 is formed by a plurality of axially spaced-apart rigid rectiliner members in the form of transversely-extending steel rods. The parts 31 of the walls of the bag laying between the reiforcements 30, are formed by a natural rubber covered knitted nylon cord reinforcement with comprises two layers of parallel nylon cords, the cords in each layer extending substantially at an angle of 30° to the longitudinal axis of the bag, the angle of the cords in one layer being of opposite sense, with respect to said axis to the angle of the cords in the other layer.

Each supporting device 26 also comprises a driving member in the form of an endless flexible driving belt 32 which is made from rubber covered longitudinally-extending steel cords to render the belt substantially inextensible in the longitudinal direction. The driving belt of each device is provided with upper and lower planar surfaces 33 to correspond with the rigid portions of the bags, the sides of the belt, in transverse section as shown in FIGURE 6, each being provided with two axially-extending fins 34.

In use of the vehicle, when the bags are in an inflated condition, the distances around the outer peripheries of each bag and its associated belt are substantially equal as described in the first embodiment. In the inflated condition of each bag, substantially the whole of the inner wall 28 of the bag lies in driving engagement with the outer peripheral surface of the belt.

The vehicle is driven, in the manner described in the first embodiment, by driving the belts through the bags to cause axial rolling movement of each bag by eversion of its two walls. During axial rolling movement of the bags, the upper and ground-contacting rigid portions of the inner and outer walls of each bag are not required to flex during movement between the two walls. Flexing of the bags is only required at the parts 31 which extend between the rigid portions, the flexing portions of the inner wall of each bag lying in intimate contact with the fin-shaped ends of its associated driving belt, and in the outer wall, the flexing portions being part cylindrical in form. During axial rolling movement of each bag, as the distances around the outer peripheral surfaces of the bags and belts are substantially equal, there is little or no peripheral tension of the material of the bags so that there is little or no tendency for fatigue failure of the bags.

Because of the rigid portions of the bags, the contact area with the ground is greater than that obtained with the use of the bags of circular cross-section in the first embodiment (compare FIGURE 6 with FIGURES 2 and 3), and heavy loads may be carried with relatively lower inflation pressures of the bags 27 compared with bags 4.

In a modification of the second embodiment (not shown), an endless rubber tread is provided around the ground-contacting portions of the inner and outer walls.

In a further modification of the second embodiment (not shown), the ground-contacting portions only of the inner and outer walls of each bag 27 are provided with a reinforcement 30.

In yet a further modification of the second embodiment, the steel rods of each reinforcement 30 are replaced with steel tubes.

In a third embodiment, a vehicle is provided with four wheel assemblies 35, one of which is shown in FIGURE 7. Each assembly comprises a vehicle support wheel 36 with a rim 37. The support wheel is rotatably mounted upon an axle 38, the wheel being spaced from the ground by an inflatable endless bag 39 of a support device 40, the bag comprising a radially inner wall 41 and radially outer wall 42 the upper portion of which lies in engagement with the rim 37 of the wheel 36.

The bag, in axial cross-section, is arcuately shaped embracing an arc of the wheel subtending an angle of 90° at the wheel centre. The bag is provided upon its inner and outer walls with transversely rigid portions (not shown) as described in the second embodiment, and is held in position between the wheel and the ground by four freely rotatable members in the form of four rollers 43 freely rotatably mounted upon brackets 44, two rollers upon each bracket at each end of the bag, with the peripheral surfaces of the rollers in engagement with the ends of the bag, the brackets being non-rotatably mounted upon the axle 38 and forming mounting means which hold each rotatable member in a fixed rotational position relative to the vehicle.

The device 40 further comprises an endless belt 45 which extends through each bag so as to lie in intimate contact with the inner wall of the bag. The belt is of similar construction to the driving belt described in the second embodiment. The belt extends around the support wheel and is radially spaced therefrom by a plurality of spaced-apart idler pulley wheels 46 which are radially spaced from the rim of the wheel, the pulley wheels 46 being rotatably mounted upon a cage structure 46a (part of which is shown) which is non-rotatably mounted upon the axle. The pulley wheel 46 which lies nearest to each end of the bag, is spring-loaded upon the cage structure for movement of the pulley wheel radially outwardly from the axis of rotation of the wheel 36 to tension the belt 45.

The belt also extends around a driving pulley wheel 47 which is located above the wheel 36, the belt being held in driving engagement with the driving pulley wheel by two idler pulley wheels 48 which are located one at each side of the wheel 47. The driving and idler pulley wheels 47 and 48 are also rotatably mounted upon the cage structure.

The driving pulley wheel is drivable by a driving motor (not shown) through a gear box and differential gear (also not shown).

To drive the vehicle, the belt 45 of each assembly is driven through the driving pulley wheel 47 by the motor, and as the belt passes through the bag 39, the bag is driven with an axially rolling movement by virtue of the driving engagement of the belt with the inner wall of the bag. Axial movement of the bag is transferred to the maintain said portion, in transverse cross-section, linear in form.

9. A device according to claim 8 wherein said transversely rigid reinforcement comprises a plurality of axially spaced-apart rigid rectilinear members which extend transversely of the inflatable support.

10. A device according to claim 8 wherein an endless rubber tread is provided around the ground-contacting portion of the inner and outer walls for contacting the ground.

11. A device according to claim 1 wherein the inflatable support comprises a rubber within which the reinforcement of substantially inextensible material is embedded.

12. A device according to claim 1 wherein the driving member is an endless flexible belt.

13. A device according to claim 1 wherein the driving member is an endless flexible belt, the radially inner and outer walls of the inflatable support are provided with a ground-contacting portion, and a plurality of collapsible pockets are provided upon and are axially spaced upon the outer peripheral surfaces of said ground-contacting portion, each pocket having an entrance at one end thereof, the entrances of all the pockets located upon the outer wall facing axially in one direction of the device to open away from the outer wall of the support to propel the device across a liquid medium when the inflatable support is moved upon the medium with an axially rolling movement with the outer wall of the support moving in said direction.

14. A device according to claim 13 wherein additional collapsible pockets are provided upon said ground-contacting portion, said additional pockets having entrances which face axially in the opposite direction of the device when the additional pockets are located upon the outer wall.

15. A vehicle comprising at least one load supporting device according to claim 12 the inflatable member of said device supporting the vehicle, a plurality of pulley wheels rotatably mounted upon the vehicle, at least one of the pulley wheels being a driving pulley wheel, the driving member extending in driving engagement around the pulley wheels, at least one rotatable member freely rotatably mounted in a fixed rotational position upon the vehicle in engagement with one axial end of the inflatable support, driving means mounted upon the vehicle, and connecting means for drivably connecting the driving means to the driving pulley wheel to drive the driving member to cause axial rolling movement of the inflatable support in the direction of the rotatable member to propel the vehicle.

16. A wheel assembly according to claim 12 comprising a vehicle support wheel having a rim, a plurality of spaced-apart pulley wheels located in radially spaced positions from the support wheel, the support wheel being rotatable relative to the pulley wheels, the supporting device being disposed with the inflatable support of the device located with its axis extending circumferentially of the wheel, the radially outer surface of the support lying in driving engagement with the wheel rim, and the driving member extending in driving engagement around said pulley wheels, and at least one rotatable member in engagement with one axial end of the inflatable support, the rotatable member being rotatably mounted upon a mounting means to hold it upon a vehicle in a fixed position of rotation relative to the vehicle when the assembly is mounted upon a vehicle, so that when the vehicle is so mounted with the inflatable support in engagement with the ground, axial movement of the inflatable support in the direction of the rotatable member, to propel the rotatable member and thus the vehicle, is effected by axial movement of the driving member.

References Cited by the Examiner

UNITED STATES PATENTS

| | | | |
|---|---|---|---|
| 2,541,928 | 3/1951 | Loomis | 305—34 |
| 2,714,011 | 7/1955 | Albee | 305—34 X |
| 2,867,480 | 1/1959 | Cushman | 305—18 |
| 2,923,578 | 2/1960 | Marsh | 305—34 X |

BENJAMIN HERSH, *Primary Examiner.*

R. J. JOHNSON, *Assistant Examiner.*